United States Patent [19]
Hess, Jr. et al.

[11] Patent Number: 5,468,361
[45] Date of Patent: Nov. 21, 1995

[54] MEMBRANE GUARD FOR A MEMBRANE ELECTRODE CELL

[75] Inventors: H. Frederick Hess, Jr., Wheaton, Ill.; H. Frederick Hess, III, Valparaiso, Ind.

[73] Assignee: UFS Corporation, Valparaiso, Ind.

[21] Appl. No.: 311,825

[22] Filed: Sep. 23, 1994

Related U.S. Application Data

[63] Continuation of Ser. No. 66,991, May 24, 1993, abandoned, which is a continuation of Ser. No. 678,733, Apr. 1, 1991, Pat. No. 5,213,671.

[51] Int. Cl.$^6$ .................... C25D 17/00; C25D 17/10
[52] U.S. Cl. .................... 204/252; 204/260; 204/282
[58] Field of Search .................... 204/252, 260, 204/282

[56] References Cited

U.S. PATENT DOCUMENTS 3,620,955  11/1971  Jones ........................ 204/283
4,676,882   6/1987  Okazaki ..................... 204/260
5,213,671   5/1993  Hess, Jr. et al. ............ 204/260

*Primary Examiner*—Kathryn Gorgos
*Attorney, Agent, or Firm*—Alan R. Loudermilk

[57] ABSTRACT

A guard for a membrane electrode cell in an electrocoat paint system that separates the counter-electrode, the object being painted, from the membrane shell housing that surrounds the electrode, which is located inside the membrane. The guard is of a grid-like structure with openings that have rounded edges and allows for the flow of electricity between the electrode and the counter-electrode and for a substantially continuous flow of paint particles around the membrane electrode cell. The guard is made from a durable, flexible, non-conducting material that is impervious to the temperature conditions and acids, solvents and other compounds often found in electrocoating paint baths. Embodiments of the present invention include an externally affixed guard, an integral guard and a rigid membrane guard.

8 Claims, 5 Drawing Sheets

MEMBRANE GUARD FOR A MEMBRANE ELECTRODE CELL

This is a continuation of application Ser. No. 08/066,991 filed on May 24, 1993, now abandoned and which is a continuation of application Ser. No. 07/678,733 filed on Apr. 1, 1991 now U.S. Pat. No. 5,213,671.

BACKGROUND OF THE INVENTION

1. Field of the Invention

The present invention relates to a membrane electrode cell system used in electrocoating, and more particularly to a membrane guard for a membrane electrode cell in an electrocoating paint system.

1. Description of the Prior Art

Electrocoating is broadly classified into two categories, anionic, using anionic paints, and cationic, using cationic paints. Both of these processes are commercially used to deposit paint films on various substrates. As used herein, electrocoating and electrodeposition are considered interchangeable terms.

Membrane electrode cells are commonly used in electrocoating systems and primarily serve two functions. The first function of the membrane electrode cell is to act as the opposing electrode in the electrocoating process, with the object being painted serving as the counter-electrode. The second function is to serve much like a dialysis cell or electro-chemical cell in which ions are removed from the paint bath to maintain proper paint bath chemistry. The membrane electrode cell can have many shapes, and often is shaped as a flat rectangle, semi-circle, tube or cylinder. An electrocoating process employing such a membrane electrode cell is disclosed in U.S. Pat. Nos. 4,851,102, 4,711,709 and 4,834,861, which are hereby incorporated by reference.

The membrane used in a membrane electrode cell can be either ion-exchange or neutral. It often is comprised of a composite of resin, binder, and flexible substrate, and typically is rather fragile and susceptible to damage. An example of an anion-selective membrane is Model Number MA3475, manufactured by Sybron Chemical, Inc. An example of a cation-selective membrane is Model Number MC3470, also manufactured by Sybron Chemical, Inc. An example of a neutral membrane is Cellgard Model Number 5511, manufactured by the Celanese Corporation.

The membrane is arranged in such a fashion as to separate the electrocoating paint bath from the electrode. An electrolyte fluid flows between the inside of the membrane and the outside of the electrode. This electrolyte fluid, which is comprised mostly of deionized water and a small amount of acid or amine (depending on the type of electrocoating employed), is responsible for flushing the ions that pass through the membrane into the membrane electrode cell from the paint bath. The conductivity of this electrolyte fluid usually is maintained in the range of 500 to 2,000 microSiemens/cm (microMho/cm).

The flow of electricity from the electrode to the counter-electrode must pass through the electrolyte fluid, membrane, electrocoating paint bath and eventually the deposited paint film. If the resistance of any of these elements increases, then the driving voltage generally must also be increased to maintain the same flow of current. The thickness of the deposited paint film (typically 0.5 to 1.5 mils) is directly related to the number of coulombs (ampere/seconds) that pass between the electrode and counter-electrode. Therefore, any reduction of the flow of electrical current results in a reduction in the rate of paint film deposition. Typical driving voltages are between 150 and 350 volts. Once the voltage goes higher than a certain level, paint film defects can occur from "rupture" where tiny air bubbles trapped in the film cause a rough film appearance.

A recurrent problem for most electrocoating systems is the loss of counter-electrodes from the conveyor hooks that move them in and through the paint bath. Some electrocoating systems paint a wide variety of sizes and shapes of counter-electrodes. Often the hooks either are not optimally designed for each and every different counter-electrode, or the counter-electrodes are incorrectly hung on the hooks. In any event, as the counter-electrodes enter the paint bath, the buoyant forces caused by the immersion of the counter-electrode into the paint bath sometimes lift them off of the hooks, and the release of trapped air from inside the counter-electrode can cause wild swings back and forth. The combination of these movements with the conveyor motion and/or paint bath agitation often causes the loosened counter-electrode to fall completely off the hook. In some cases, a trailing counter-electrode that is on a hook directly behind the loose counter-electrode can also become entangled and cause successive counter-electrodes to pile up, much like an automobile chain collision.

As counter-electrodes come loose and fall off their hooks, they can come into physical contact with the membrane electrode cells that generally are arrayed along the long sides of the paint bath tank. Also, maintenance personnel sometimes use long-handled grappling hooks to remove the fallen counter-electrodes and either the grappling hook or the retrieved counter-electrode can come into contact with the membrane electrode cell. Since the membrane can represent up to about 90 to 95% of the exposed surface area of the membrane electrode cell, it is especially vulnerable to physical damage if any object comes into direct physical contact with the membrane electrode cell.

If the membrane suffers a cut, puncture, hole or rip, then its functionality can be severely and adversely affected. Once an opening, or "short-circuit" path, through the membrane is created, the membrane no longer can effectively remove ions or easily allow the passage of current to the counter-electrode, thereby impeding or stopping altogether the electrocoating process. Two things occur almost immediately after a membrane is penetrated by a counter-electrode or other object. The first is that the electrolyte fluid becomes contaminated with paint. Since the paint particles carry the same charge as the electrode, they are repelled by the electrode. With no ready way out, these paint particles attempt to escape through the membrane. This often results in the deposition of the paint particles on the inner surface of the membrane because they are too large to migrate through the small passages of the membrane. This phenomena "fouls" the membrane, and the resistance of the membrane can dramatically increase.

The second problem occurs thereafter. With the membrane fouled, it no longer effectively removes ions from the paint bath. With the ion-removal process disrupted, the chemical balance of the paint tank is soon upset.

Over the years many attempts have been made to decrease the incidence of damaged or compromised membranes. Polyvinyl chloride (or "PVC") pipes, sometimes called rub rails, have been positioned between the membrane electrode cell and the counter-electrode. If a counter-electrode swings from side-to side, then these rub rails tend to keep the counter-electrode from contacting the membrane electrode cell. Normally, two or three rub rails are equally spaced vertically between the top and the bottom of the counter-electrode. While rub rails do offer some degree of protection, the size and shape of counter-electrodes vary to a high degree, limiting the effectiveness of this approach. Moreover, it is not practical to put rub rails throughout the paint bath, since this would block the free-flow communication of paint and electricity between the electrodes and also physically reduce the working volume of the paint bath. A further disadvantage of rub rails is that membranes can still be damaged if corners or sharp edges of certain counter-electrodes pass in between or around a rub rail and collide with the membrane.

Another method of preventing physical contact with the membrane electrode cell employs non-conductive, perforated barriers (material such as PVC or fiberglass) that may be as much as 1 inch deep with 1 inch by 1 inch openings. This method overcomes some of the problems associated with the PVC rub rails in that the network of openings in the barrier can be smaller than the gaps between the PVC rub rails. A disadvantage of this method, however, is that the depth and relatively large exposed surface area of the barrier create a significant disruption to the free-flow communication and circulation of the paint.

A high percentage of the electrocoat paint bath is water. The remainder mostly is paint resin, pigment, neutralizer and solvent. The paint bath must be vigorously agitated on a substantially continuous basis or the paint particles will tend to fall out of solution and gather at the bottom of the tank. Hence, any object inside the tank that presents itself as a significant flow or circulation restrictor, especially one with flat, horizontal or vertical surfaces, will tend to cause paint particles to fall out of solution and also disrupt the even and orderly lines of current between the electrode and the counter-electrode. If these paint particles begin to coagulate, they can start to gather and pile up on any flat ledges or openings of any protective barrier. If left unchecked, the coagulated particles can "grow" to a level where small, semi-hardened pieces can flake off. These coagulated paint particles can then settle out on the counter-electrodes and cause a myriad of paint film defects. Once paint particles begin to coagulate, the task of getting those paint particles back into solution can be a costly and time consuming undertaking. In addition, the driving voltage must be higher than otherwise to overcome the restrictions to the flow of electrical current caused by this kind of protective barrier, which is less efficient in terms of energy consumption and paint bath cooling.

Large diameter PVC pipes with numerous holes (typically ½ to ¾ inches) drilled in them have also been used in an effort to protect the membrane. The membrane electrode cell can be placed inside of these pipes, offering some degree of protection. This method suffers, however, from the same drawbacks of the external barriers. The wall thickness of the large diameter (say 4 or 6 inches) pipes can be as much as 0.432 inches. Once a hole is drilled through the pipe and it is then placed in a vertical position, the bottom side of the hole acts as a ledge. As the undrilled portions of the pipe act as a flow restrictor to the free-flow of paint, small amounts of paint particles fall out of solution and settle on this ledge. The undrilled portions of the pipe also act to disrupt the free-flow communication of the current much like other prior art barriers.

Yet another structure has been fabricated from large flat sheets made of non-conductive material (such as PVC or what is known in the industry by the trademark Nylon). One prior art structure covered a planar electrode with a flat steel grill coated with a plastic material. Many holes (say ¼ to ¾ inches) or other perforations are drilled or cast into the flat sheet or grill. This sheet may be as thick as ½ inch. These structures, like the drilled PVC pipe, offer some protection for the membrane, but they also suffer from the same disadvantages discussed above. Moreover, the plastic coated steel grill structure suffers from several additional drawbacks. The plastic coating can be scratched or nicked, providing a site for paint deposition. Because the paint typically does not cure, it eventually falls off, resulting in paint film defects. Further, the conductivity of the steel in the grill poses undesirable electrical isolation problems.

Another method for protecting the membrane electrode cell involves the use of a non-conducting mesh material wrapped around the membrane. This mesh has much smaller openings than discussed above and is used in such a way that the mesh makes direct contact with the membrane. While the mesh does offer some protection for the membrane, it has several drawbacks. For example, since the mesh makes direct contact with the membrane, some of the membrane passages are completely blocked off, thereby reducing the efficiency of the membrane. In addition, the mesh can inadvertently chafe or abrade the membrane at the contact points, resulting in damage to the membrane. Moreover, paint particles can build up on the horizontal surfaces of the mesh where the mesh makes contact with the membrane.

Another version of this approach uses long slender, rectangular-cross section, non-conducting pieces with small inter-connecting supports arrayed to form a grill completely over the membrane. Since the supports used in this approach also come in direct contact with the membrane, it suffers from the same disadvantages. Another drawback to this approach is that, since the grill is mostly one-directional, in some instances it can act as a guide or channelling mechanism and direct counter-electrodes or other objects into contact with the membrane.

Even though these prior methods more or less offer some protection for the membrane electrode cell, they all create drawbacks that ultimately can be just as serious as the damage caused when a membrane is penetrated. Hence, it is desirous to develop a guard that protects the membrane, but does not disrupt the free-flow communication of paint particles or electrical current vital to a properly-functioning electrocoating system.

SUMMARY OF THE INVENTION

The present invention overcomes the aforementioned disadvantages of the prior art. The general object of the present invention is to provide a guard system that is externally affixed to or integral with a membrane electrode cell and that is capable of offering significant protection for the membrane while maintaining free-flow communication of the paint and electrical current in the paint bath. The present invention is particularly applicable to membrane electrode cells of cylindrical or tubular shape. The guard of the present invention can be of small diameter (such as approximately 3 inches) and of a shape or profile conducive to flow of paint particles around and through the guard. Paint particles can more readily slip around a curved object as opposed to a rectangular or planar object such as is the case with rectangular forms of membrane electrode cells or with prior art barriers. In addition, the present invention provides a concentric and tubular guard that is formed around a membrane electrode cell of a smaller diameter but which shares the same centerline.

Another object of the present invention is provide even higher levels of durability by combining a rigid membrane structure along with a guard for even greater protection.

Yet another object of the present invention is to provide a light-weight and flexible guard and membrane cell structure that readily deflects and/or absorbs the impact energy of a counter-electrode or other object.

BRIEF DESCRIPTION OF THE DRAWINGS

The above-mentioned features and objectives of the present invention will become more apparent by reference to the following description taken in conjunction with the accompanying drawings, in which.

DETAILED DESCRIPTION OF THE PREFERRED EMBODIMENT

Detailed description will hereunder be given of embodiments of the present invention with reference to the drawings.

Figure 1:
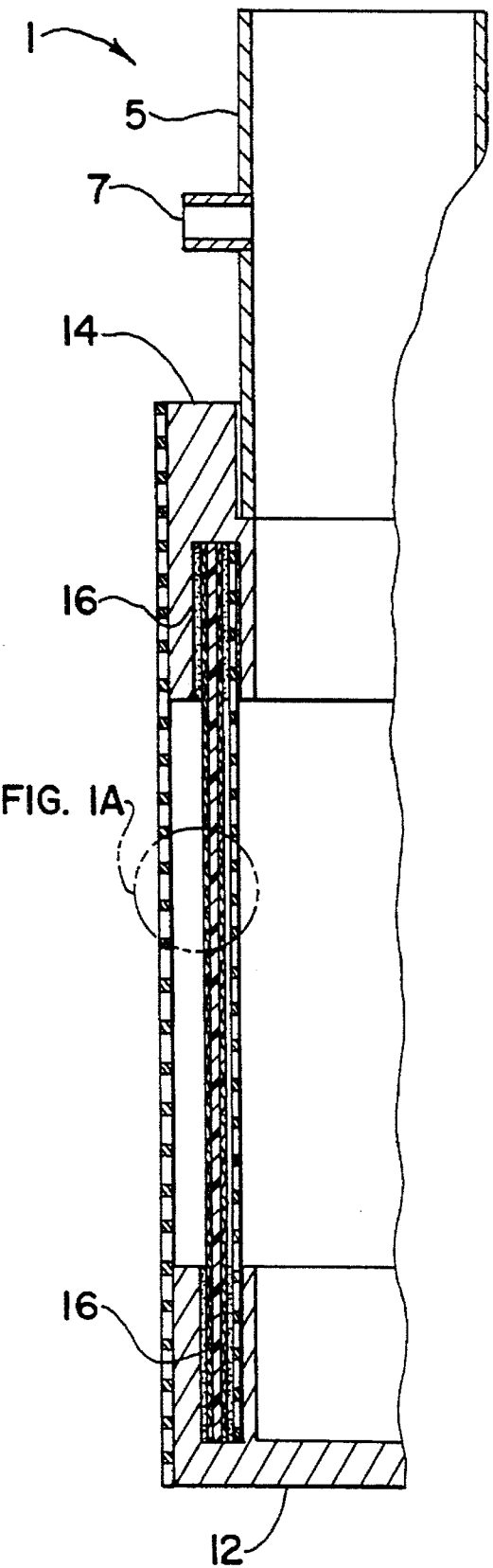
FIG. 1 is a vertical fractional view illustrating an externally affixed embodiment of the present invention.
Figure 2:
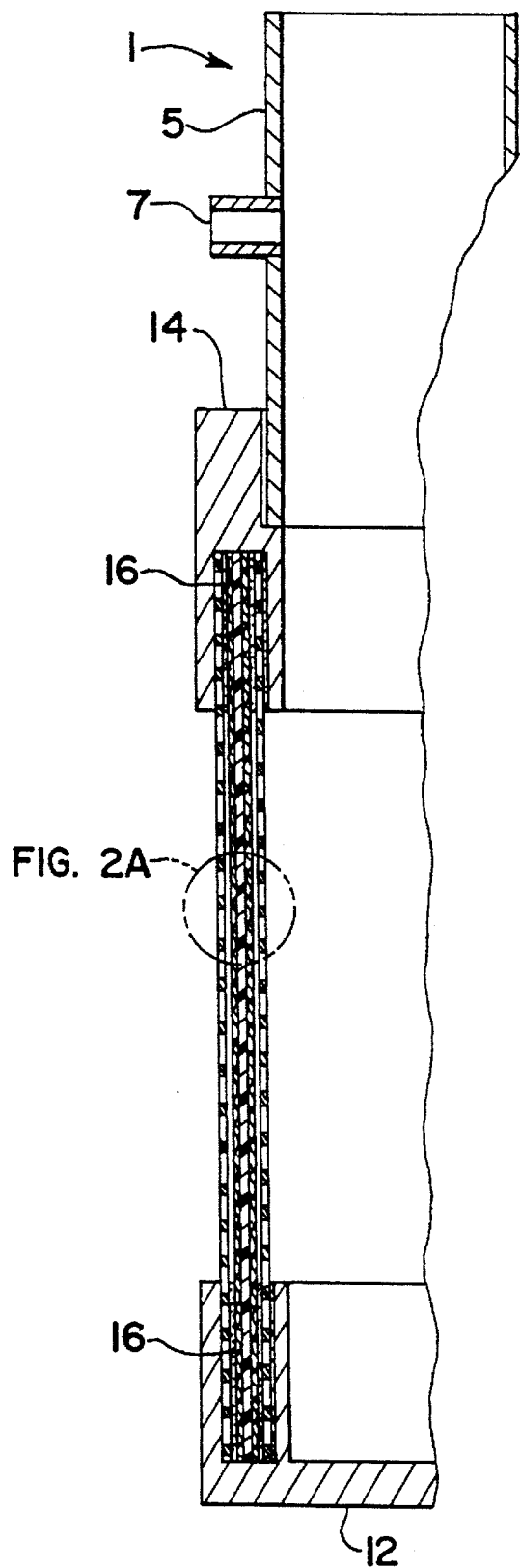
FIG. 2 is a vertical fractional view illustrating an integral embodiment of the present invention.
Figure 5:
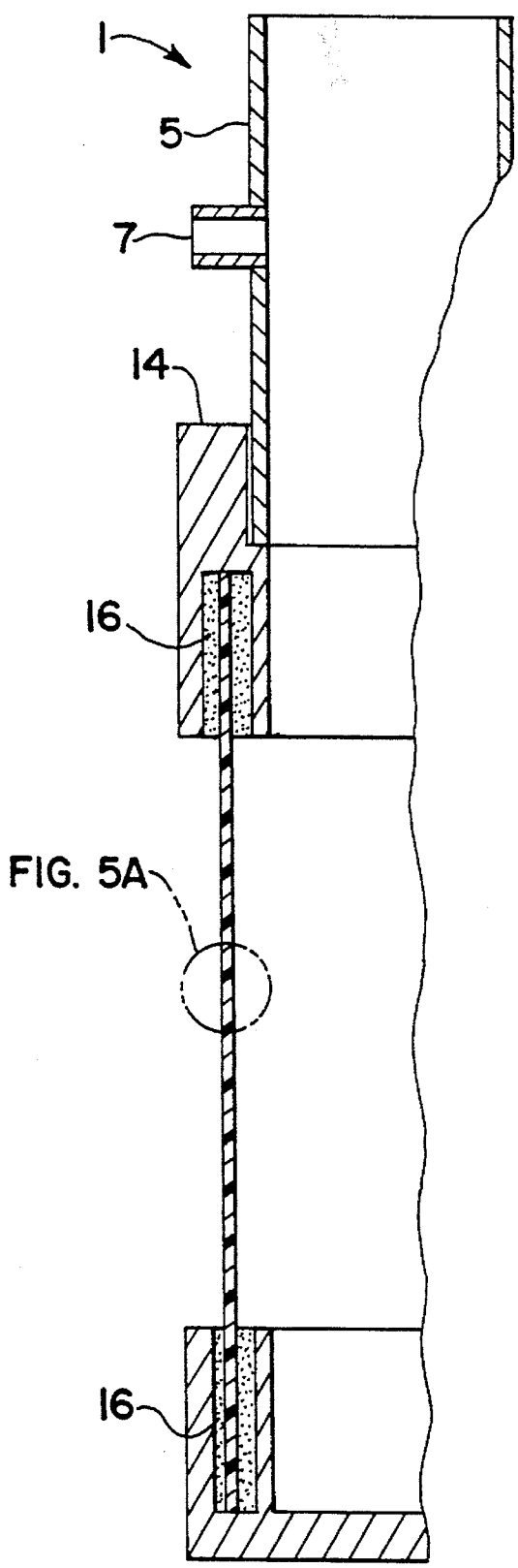
FIG. 5 is a vertical fractional view illustrating a rigid membrane embodiment of the present invention.
Figure 5A:
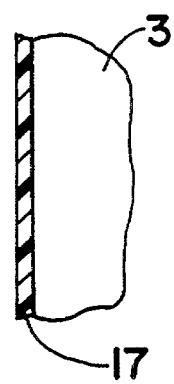
FIG. 5A is an expanded view of a portion of the embodiment illustrated in FIG. 5.

In FIGS. 1, 2 and 5, a fractional view of only one half of a tubular or cylindrical membrane electrode cell is shown in a vertical position, which would be disposed in an aqueous solution for electrocoating. The electrode, electrical connection, electrolyte fluid supply line and its connection are not shown, but such elements can be arranged such as described in U.S. Pat. Nos. 4,711,709 and 4,834,861. The membrane electrode cell may also include other elements which are described in these patents. While the preferred embodiment of the present invention is a guard for tubular or cylindrical membrane electrode cells, the present invention can be applied to a variety of shapes of membrane electrode cells. It is noted that with tubular or cylindrical membrane electrode cells, the surface area of the guard is significantly greater than the surface area of the electrode. Thus, the flux density is lower at the guard than at the surface-of the electrode, resulting in better efficiency (because of more open surface area) than planar barriers where the surface area ratio of the guard to the electrode essentially is one to one.

The present invention is useful with components that are consolidated over what was disclosed in U.S. Pat. No. 4,711,709. Without limiting the applicability of the present invention, cap 12 generally corresponds to second insulating tube 6, rubber packing 11, waterproof cap 12, and band 9B shown in FIG. 1 of U.S. Pat. No. 4,711,709. Similarly, collar 14 generally corresponds to first insulating tube 5 and band 9A shown in FIG. 1 of U.S. Pat. No. 4,711,709.

Figure 1A:
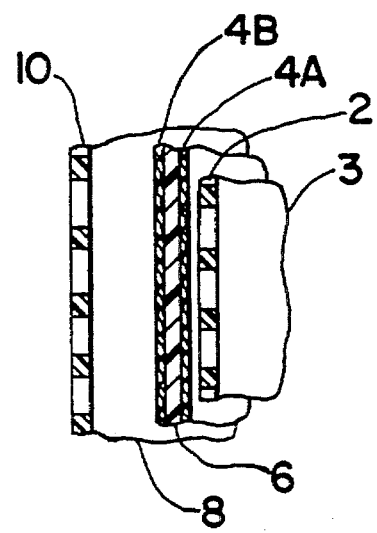
FIG. 1A is an expanded view of a portion of the embodiment illustrated in FIG. 1.

In FIGS. 1 and 1A, guard 10 is externally affixed to membrane shell 1. Guard 10 is made from a durable, non-conducting material that is resistant to attack from chemical agents, temperature, and most impact forces found in electrocoating paint baths. Guard 10, as well as guard 15 (FIG. 2) and rigid form 18 (FIG. 6), can be fashioned from a thermoplastic such as polyethylene (low, medium or high density versions), polypropylene, Nylon or PVC. Guard 10 is fashioned in such a manner that its inside diameter snugly fits over collar 14 and cap 12. Guard 10 can be firmly attached to either collar 14 or cap 12 or both by means of applying a common chemical-resistant epoxy or by using a PVC or other appropriate weld.

Porous tube 2 is made from a reticulated, flexible, non-conducting, durable, chemical and heat resistant material and is fashioned to the proper length. Porous tube 2, which is permeable to both water and electrical current, separates collar 14 and cap 12 and acts as a membrane support member. Porous tube 2 is made with such an inside diameter that it forms a snug fit over the outside diameter of the inner lip of both collar 14 and cap 12. Neck 5 is glued into collar 14. Overflow nozzle 7 is provided to allow passage of electrolyte fluid out of membrane shell 1 (FIG. 1). Membrane 6 is disposed in a form to encircle the outer circumference of porous tube 2 with cloth 4A inserted in between to form an intermediate layer. Outer cloth 4B covers the outer surface of membrane 6 by forming an encircling layer. Cloths 4A and 4B are made from chemical fibers and are water permeable as well as sufficiently durable against tensile force. Collar 14 and cap 12 are assembled to the structure by using chemical-resistant epoxy 16. Generally, the materials used in the construction of membrane shell 1 are all of a non-conducting synthetic thermoset or thermoplastic materials such as polyethylene, polypropylene, Nylon or PVC, and ensures an inert, durable, lightweight and flexible shell structure. Membrane shell 1 houses the membrane around the electrode and provides water passage 3 around the electrode (not explicitly shown).

Gap 8 between cloth 4B and the inner surface of guard 10 can be any suitable width conducive to paint flow in and around guard 10, and in the preferred embodiment is in the range of about 0.3 to 0.4 inches. Porous tube 2, membrane 6 and guard 10 all share the same centerline and have a substantially fixed concentric relationship. They are thus self-centering, and gap 8 is substantially the same at all points around the circumference of membrane 6. Gap 8 allows for flow communication of the paint particles in and around and through guard 10 while minimizing the coagulation of paint particles common with prior art barriers. The reticular feature of guards 10 and 15 (also see FIG. 3 and FIG. 4) and guard 15 provides a substantial amount of open space, which can be up to 50% or more, and still have enough tensile strength to remain intact after an object makes physical contact. Since guards 10 and 15 are flexible, some of the durability is attributable to the fact that the guard can absorb most impacts. While guard 10 or guard 15 may bend or deform slightly under stress, it generally returns to its original shape.

Figure 2A:
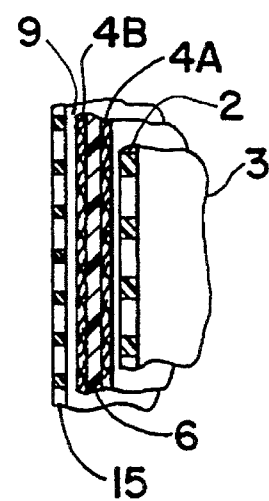
FIG. 2A is an expanded view of a portion of the embodiment illustrated in FIG. 2.

FIGS. 2 and 2A illustrate an embodiment of the present invention in which guard 15 is an integral part of the assembly of membrane shell 1. With the exception of guard 15 and gap 9, the elements of FIG. 2, and the reference numerals therefor, generally are the same as in FIG. 1. In this embodiment, guard 15 is fashioned to the proper length and assembled integral with porous tube 2, inner cloth 4A, membrane 6, and outer cloth 4B. The outside diameter of guard 15 is such that it forms a snug fit with the inside diameter of the outer lip of both collar 14 and cap 12. Gap 9 generally is established by the difference between the inside diameter of guard 15 and the outside diameter of cloth 4B, which generally is established by the outside diameters of membrane 6, cloth 4A and porous tube 2. By appropriate selection of the material diameters, gap 9 can be any of a variety of widths, and in the preferred embodiment is in the range of 0.1 to 0.15 inches and allows flow communication of the paint particles through and around guard 15. As with the embodiment shown in FIG. 1, gap 9 is substantially the same at all points around the circumference of membrane 6 due to the self-centering and substantially fixed concentric relationship of guard 15, membrane 6 and porous tube 2.

Figure 3:
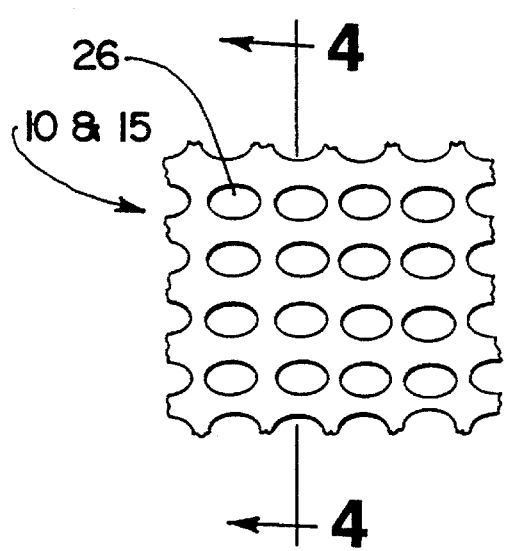
FIG. 3 is a fractional view illustrating an embodiment of the membrane guard of the present invention.
Figure 4:
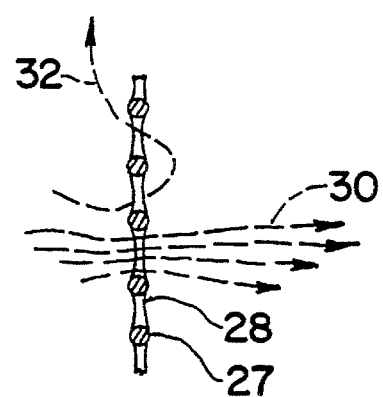
FIG. 4 is a section view of the membrane guard shown in FIG. 5.

Both guards 10 and 15 do not substantially impede the flow of electrical current from the electrode to the counter-electrode. The preferred embodiments of guards 10 and 15 are shown in FIG. 3. The high percentage of open area, combined with the small physical size and narrow profile of the interconnecting network (see FIG. 4) do not substantially restrict the lines of electrical current 30. Openings 26 are substantially elliptical in shape (approximately 0.275 inches and 0.175 inches along the axes of the ellipse in the preferred embodiment) and when viewed in the section view (FIG. 4) horizontal connecting elements 27 are circular or oval in shape and without sharp corners, planar shapes or other flat profiles. When guards 10 and 15 are viewed in the horizontal section view (not explicitly shown), vertical connecting elements 28 are also oval or circular in shape and without sharp corners, planar shapes or other flat profiles. In the preferred embodiment, connecting elements 27 and 28 are approximately 0.1 inches in thickness.

The combination of these complex, curved profiles reduce the number of potential sites where paint particles 32 might coagulate on guards 10 or 15. There are no flat ledges or corners and the flow communication is strong, which results in substantial turbulence around, in and through guards 10 and 15, which tends to keep the paint particles in constant motion.

In other embodiments of the present invention, shims or spacers (not explicitly shown) also are provided to control gap 8 (FIG. 1) or gap 9 (FIG. 2). For example, gap 8 can be widened by placement of one or more shims or spacers between guard 10 and collar 14 and cap 12, and gap 9 can be widened by placement of one or more shims or spacers between guard 15 and cloth 4B or narrowed by placement of one or more shims or spacers between guard 15 and collar 14 and cap 12.

Another embodiment of the present invention is illustrated in FIGS. 5, 5A, 6 and 6A. In this embodiment, the guard structure also serves as the supporting structure for the membrane materials. Rigid membrane structure 17 is fashioned to the proper length and assembled to collar 14 and cap 12 by using chemical-resistant epoxy 16. Rigid membrane structure 17 is further illustrated in FIG. 6. Rigid form 18 is formed by a reticulated, durable, flexible, chemical and temperature resistant material such as used for guard 10 and guard 15. Membrane resin particles 20 are cast into the openings of rigid form 18 and held in place by using binder 22, which in the preferred embodiment is a material such as polyvinylidene fluoride, sometimes sold under the trade trademark Kynar. The spacing of adjacent connecting members of rigid form 18 and their higher profile (as compared to membrane resins 20 and binder 22 cast in between) are such that an errant counter-electrode will strike it first and absorb the shock, thus avoiding damage to resin particles 20 or binder 22.

Figure 6:
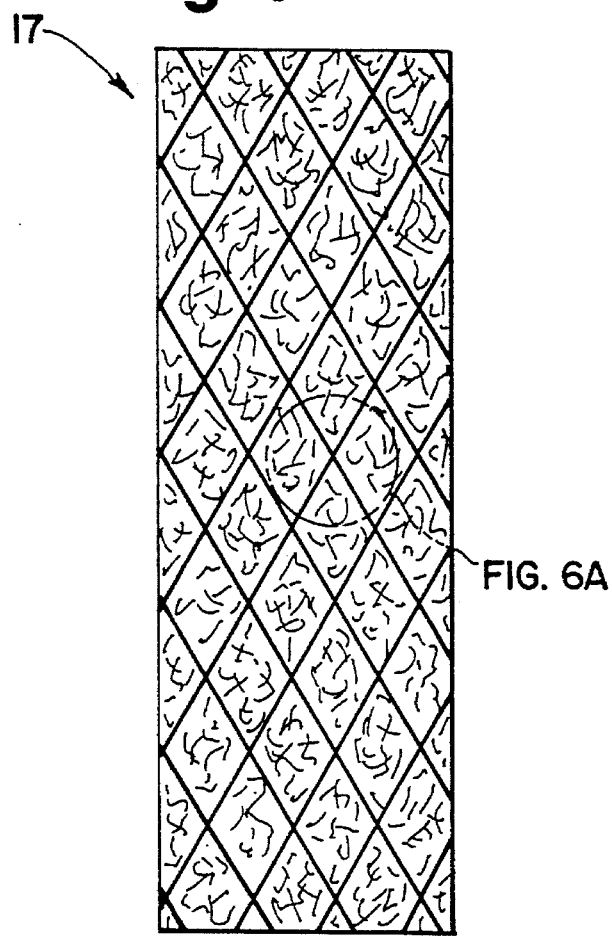
FIG. 6 illustrates a rigid membrane assembly.
Figure 6A:
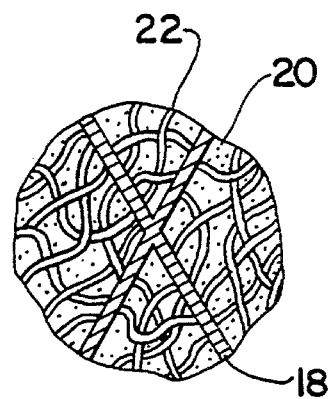
FIG. 6A is an expanded view of the assembly illustrated in FIG. 6.

While FIG. 6 illustrates rigid form 18 with openings that are substantially in the shape of a diamond, other opening profiles (such as the ellipses shown in FIG. 3) are used in other embodiments. Resin particles 20 and binder 22 are cast into the openings of rigid form 18 and substantially fill any sharp corners and eliminate ledges associated with rigid form 18.

In other embodiments of the present invention, rigid membrane structure 17 of FIG. 5 is substituted for porous tube 2, cloths 4A and 4B and membrane 6 of FIGS. 1 and 2, and combined with guard 10 of FIG. 1 and guard 15 of FIG. 2, respectively. In these embodiments, a double guarded structure is produced whereby guard 10, or alternatively guard 15, protects the already durable rigid membrane structure 17.

Similarly, in other embodiments of the present invention, guards 10 and 15 are utilized with other membrane structures, such as a membrane comprised of resins in a unitary, semi-rigid binder. In these embodiments, guards 10 and 15 typically are attached only at one point (either at collar 14 or cap 12) because these unitary membrane structures typically swell as water is absorbed. Attaching at only one end of the guard allows the guard to be "floating" with respect to the membrane structure, thereby accommodating any dimensional changes in the membrane structure.

In still other embodiments of the present invention, the guarded membrane electrodes (such as shown in FIGS. 1, 2 and 5) are, for example, placed horizontally in the paint bath tank and combined with vertical rub rails or other prior art barriers for added membrane electrode protection.

While the present invention has been described in terms of preferred and alternative embodiments, it will be obvious to one skilled in the art that many alterations and modifications may be made without substantially departing from the spirit of the invention. Accordingly, it is intended that all such alterations and modifications be included in the spirit and scope of the invention as defined by the appended claims.

We claim:

1. A membrane electrode cell for electrocoat painting of a counter-electrode, comprising:

a tubular membrane structure having an inner surface and an outer surface, wherein at least a portion of the outer surface of the tubular membrane structure comprises a membrane having an outer surface;

an electrode disposed substantially within the tubular membrane structure, wherein the electrode is positioned within the tubular membrane structure in a manner to allow passage of a flushing fluid between the electrode and the inner surface of the tubular membrane structure; and a tubular guard having an inner surface and an outer surface, wherein the tubular membrane structure and electrode are positioned within the tubular guard in a substantially concentric manner wherein the tubular guard may serve to prevent physical contact between the counter-electrode or other object and the outer surface of the tubular membrane structure, wherein the tubular guard is comprised of a non-conductive material and has a plurality of openings in the surface thereof, wherein the openings have substantially curved surfaces along portions of the periphery thereof.

2. The membrane electrode cell of claim 1, wherein the openings in the tubular guard are substantially in the shape of an oval.

3. The membrane electrode cell of claim 1, wherein the openings in the tubular guard are substantially in the shape of a circle.

4. The membrane electrode cell of claim 1, wherein the openings in the tubular guard are substantially of elliptical shape.

5. The membrane electrode cell of claim 4, wherein the ellipse of the openings is approximately 0.275 inches in length along one axis of the ellipse and approximately 0.175 inches in length along the other axis of the ellipse.

6. The membrane electrode cell of claim 1, wherein the tubular guard is concentrically positioned around the membrane structure to define a substantially uniform gap.

7. The membrane electrode cell of claim 6, wherein the gap is in the range of about 0.1 to 0.15 inches.

8. The membrane electrode cell of claim 6, wherein the gap is in the range of about 0.3 to 0.4 inches.

* * * * *